US010255548B1

(12) United States Patent
Chelian et al.

(10) Patent No.: US 10,255,548 B1
(45) Date of Patent: Apr. 9, 2019

(54) METHOD AND APPARATUS FOR MODELING PROBABILITY MATCHING HUMAN SUBJECTS IN N-ARM BANDIT TASKS

(71) Applicant: HRL Laboratories, LLC, Malibu, CA (US)

(72) Inventors: Suhas E. Chelian, San Jose, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 680 days.

(21) Appl. No.: 14/933,414

(22) Filed: Nov. 5, 2015

Related U.S. Application Data

(63) Continuation-in-part of application No. 14/693,485, filed on Apr. 22, 2015, now Pat. No. 10,133,983, which is a continuation-in-part of application No. 14/334,649, filed on Jul. 17, 2014, now Pat. No. 9,552,544.

(60) Provisional application No. 61/885,641, filed on Oct. 2, 2013, provisional application No. 61/982,696, filed on Apr. 22, 2014, provisional application No. 61/885,641, filed on Oct. 2, 2013, provisional application No. 62/076,444, filed on Nov. 6, 2014.

(51) Int. Cl.
*G06N 3/04* (2006.01)
*G06N 3/08* (2006.01)

(52) U.S. Cl.
CPC .............. *G06N 3/0472* (2013.01); *G06N 3/08* (2013.01)

(58) Field of Classification Search
USPC .......................................... 706/19
See application file for complete search history.

(56) References Cited

U.S. PATENT DOCUMENTS

| 6,769,066 | B1 | 7/2004 | Botros |
| 7,464,410 | B1 | 12/2008 | Halasz |
| 7,487,544 | B2 | 2/2009 | Schultz |
| 8,301,770 | B2 | 10/2012 | van Coppenolle |
| 8,948,499 | B1 * | 2/2015 | Medasani .......... G06K 9/00771 |
| | | | 382/155 |
| 8,990,139 | B1 * | 3/2015 | Howard ............... G06Q 10/101 |
| | | | 706/46 |

(Continued)

OTHER PUBLICATIONS

Posterior Probability Matching and Human Perceptual Decision Making, Richard F. Murray, Khushbu Patel, Alan Yee, Department of Psychology and Centre for Vision Research, York University, Toronto, Ontario, Canada, PLOS Computational Biology | DOI:10.1371/journal.pcbi.1004342 Jun. 16, 2015, pp. 1-16.*

(Continued)

*Primary Examiner* — Michael B Holmes
(74) *Attorney, Agent, or Firm* — Tope-McKay & Associates

(57) ABSTRACT

Described is a system for modeling probability matching in human subjects. Features related to probability matching are extracted from a set of human subject responses from behavioral tasks. Neural network model instances are trained on the set of features, resulting in a set of trained neural network model instances. A set of model parameters are derived from the set of trained neural network instances, and the set of derived model parameters are used to emulate human performance on novel data.

12 Claims, 9 Drawing Sheets

(56) References Cited

U.S. PATENT DOCUMENTS

| | | | | |
|---|---|---|---|---|
| 9,002,098 | B1* | 4/2015 | Chelian | G06T 7/74 |
| | | | | 382/153 |
| 9,002,762 | B1* | 4/2015 | Howard | G06N 3/02 |
| | | | | 706/20 |
| 9,060,658 | B2* | 6/2015 | Choi | A47L 9/009 |
| 9,111,182 | B1* | 8/2015 | Chelian | G06K 9/4628 |
| 9,129,158 | B1* | 9/2015 | Medasani | G06K 9/00335 |
| 9,269,027 | B1* | 2/2016 | Khosla | G06K 9/00496 |
| 9,412,051 | B1* | 8/2016 | Chelian | G06N 3/0445 |
| 9,443,189 | B1* | 9/2016 | Chelian | G06N 3/02 |
| 9,524,031 | B2* | 12/2016 | Yeom | G06F 3/017 |
| 9,552,544 | B1* | 1/2017 | Chelian | G06N 3/0472 |
| 9,646,056 | B1* | 5/2017 | Phillips | G06N 3/0427 |
| 9,646,248 | B1* | 5/2017 | Benvenuto | G06N 5/022 |
| 9,824,607 | B1* | 11/2017 | Bhattacharyya | G06N 5/04 |
| 10,052,062 | B2* | 8/2018 | De Sapio | A61B 5/1117 |
| 10,092,753 | B1* | 10/2018 | Howard | A61N 1/36025 |
| 2003/0051026 | A1 | 3/2003 | Carter | |
| 2007/0239314 | A1 | 10/2007 | Kuvich | |
| 2011/0295823 | A1* | 12/2011 | Sathish | G06F 17/30294 |
| | | | | 707/705 |
| 2012/0019627 | A1* | 1/2012 | Choi | A47L 9/009 |
| | | | | 348/50 |
| 2014/0058988 | A1 | 2/2014 | Lai | |
| 2015/0138088 | A1* | 5/2015 | Yeom | G06F 3/017 |
| | | | | 345/158 |

OTHER PUBLICATIONS

Single View Human Action Recognition using Key Pose Matching and Viterbi, Path Searching, Fengjun Lv Ramakant Nevatia Institute for Robotics and Intelligent Systems, 1-4244-1180-7/07 2007 IEEE.*

Example-Based Learning for View-Based, Human Face Detection, Kah-Kay Sung and Tomaso Poggio, IEEE Transactions on Pattern Analysis and Machine Intelligence, vol. 20, No. 1, Jan. 1998, 0162-8828/98 1998 IEEE.*

Human Motion Analysis: A Review, J. K. Aggarwal and Q. Cai, Computer and Vision Research Center, Department of Electrical and Computer Engineering, The University of Texas at Austin, 1077-3142/99 1999 by Academic Press.*

Probability Matching via Deterministic Neural Networks, Milad Kharratzadeh & Thomas Shultz, 2015, pp. 1-9.*

Comparing deep neural networks against humans: object recognition when the signal gets weaker, Robert Geirhos, David H. J. Janssen, Heiko H. Schutt, Jonas Rauber, Matthias Bethge, and Felix A. Wichmann Jun. 21, 2017, pp. 1-31.*

Science Human-level concept learning through probabilistic program induction, Brenden M. Lake, Ruslan Salakhutdinov, Joshua B. Tenenbaum Science Dec. 11, 2015: vol. 350, Issue 6266, pp. 1332-1338.*

ScienceDirect Current Opinion in Neurobiology vol. 12, Issue 2, Apr. 1, 2002, pp. 217-222 Central mechanisms of motor skill learning, Okihide Hikosaka, Kae Nakamura, Katsuyuki Sakai, Hiroyuki Nakahara.*

Chelian, S.E., Bhattacharyya, R., & O'Reilly, R. (2011). Learning categories with invariances in a neural network model of prefrontal cortex. In Proceedings of the Second Annual Meeting of the BICA Society (BICA 2011), Arlington, USA, pp. 50-55.

Erev, I. & Barron, G. (2005). On adaptation, maximization, and reinforcement learing among cognitive strategies. Psychological review, 112, pp. 912-931.

Frank, M.J., Seeberger, L. & O'Reilly, R.C. (2004). By carrot or by stick: cognitive reinforcement learning in Parkinsonism. Science, 306, pp. 1940-1943.

Herd, S.A., Krueger, K.A., Kriete, T.E., Huang, T. & O'Reilly, R.C. (2013). Strategic cognitive sequencing: a computational cognitive neuroscience approach. Computational Intelligence and Neuroscience, 149329, pp. 1-18.

Lee, M.D., Zhang, S., Munro, M. & Steyvers, M. (2011). Psychological models of human and optimal performance in bandit problems. Cognitive Systems Research, 12, pp. 164-174.

O'Reilly, R.C. & Frank, M.J. (2006). Making working memory work: a computational model of learning in the frontal cortex and basal ganglia, Neural Computation, 18, pp. 283-328.

Sul, J.H., Kim, H., Huh, N., Lee, D., & Jung, M.W. (2010). Distinct roles of rodent orbitofrontal and medial prefrontal cortex in decision making, Neuron, 66, pp. 449-460.

Walton, M.E., Behrens, T.E., Buckley, M.J., Rudebeck, P.H., & Rushworth, M.F. (2010). Separable learning systems in the macaque brain and the role of orbitofrontal cortex in contingent learning. Neuron, 65, pp. 927-939.

Wunderlich, K., Rangel, A., & O'Doherty, J.P. (2009). Neural computations underlying action-based decision making in the human brain. Proceedings of the National Academy of Sciences, 106. pp. 17199-17204.

Burns, K. and Bonaceto, C. (2014) MITRE Tethnical Report. Integrated cognitive-neuroscience architectures for understanding sensemaking (ICArUS): phase 2 challenge problem design and test specification, pp. 1-39.

J. Krichmar, "The neuromodulatory system—a framework for survival and adaptive behavior in a challenging world," Adaptive Behavior, vol. 16, No. 6, pp. 385-399, Dec. 2008.

W. Schultz, "Dopamine neurons and their role in reward mechanisms," Curr. Opin. Neurobiol., vol. 7, No. 2, pp. 191-197, Apr. 1997.

K. Berridge, "Motivation concepts in behavioral neuroscience," Physiol. Behav., vol. 81, No. 2, pp. 179-209, Apr. 2004.

M. Millan, "The neurobiology and control of anxious states," Prog. Neurobiol., vol. 70, No. 2, pp. 83-244, Jun. 2003.

M. Crockett, L. Clark, G. Tabibnia, M. Lieberman, and T. Robbins, "Serotonin modulates behavioral reactions to unfairness," Science, vol. 320, No. 5884, p. 1739, Jun. 2008.

A. Chiba, D. Bucci, P. Holland, and M. Gallagher, "Basal forebrain cholinergic lesions disrupt increments but not decrements in conditioned stimulus processing," J. Neurosci., vol. 15, No. 11, pp. 7315-7322, Nov. 1995.

M. Baxter, P. Holland, and M. Gallagher, "Disruption of decrements in conditioned stimulus processing by selective removal of hippocampal cholinergic input," J. Neurosci., vol. 17, No. 13, pp. 5230-5236, Jul. 1997.

R. Ross, J. McGaughy, and H. Eichenbaum, "Acetylcholine in the orbitofrontal cortex is necessary for the acquisition of a socially transmitted food preference," Learn. Mem., vol. 12, No. 3, pp. 302-306, May 2005.

P. Rudebeck, M. Walton, A. Smyth, D. Bannerman, and M. Rushworth, "Separate neural pathways process different decision costs," Nature Neurosci., vol. 9, No. 9, pp. 1161-1168, Aug. 2006.

M. Rushworth, T. Behrens, P. Rudebeck, and M. Walton, "Contrasting roles for cingulated and orbitofrontal cortex in decisions and social behavior," Trends in Cog. Sci., vol. 11, No. 4, pp. 168-176, Apr. 2007.

N. Oros, A. Chiba, D. Nitz, M. Avery, and J. Krichmar, "Simulation of the neuromodulatory pathways responsible for incrementing and decrementing attention during reversal learning and set-shifting," In Proceeding of the Society for Neuroscience, Washington, D.C., 2011.

A. Zaldivar, D. Asher, and J Krichmar, "Simulation of how neuromodulation influences cooperative behavior," in Simulation of Adaptive Behavior: From Animals to Animats, Lecture Notes on Artificial Intelligence. Berlin, Germany, Springer-Verlag, 2010, pp. 649-660.

A. Niculescu-Mizil, "Multi-armed bandits with betting—on-line learning with limited feedback," in Conference on Learning Theory, Montreal, 2009.

R. Cools, K. Nakamura, and N. Daw, "Serotonin and dopamine: unifying affective, activational, and decision functions," Neuropsychopharm., vol. 36, No. 1, pp. 98-113, Jan. 2011.

F. Denk et al., "Differential involvement of serotonin and dopamine systems in cost-benefit decisions about delay or effort." Psychopharm. vol. 179, No. 3, pp. 587-596, Dec. 2005.

(56) References Cited

OTHER PUBLICATIONS

P. Roussos, S. Giakoumaki, S. Pavlakis, and P. Bitsios, "Planning, decision-making and the COMT rs4818 polymorphism in healthy males," Neuropsychologia, vol. 46, No. 2, pp. 757-763, Oct. 2008.
W. Alexander and J. Brown, "Computational models of performance monitoring and cognitive control," Topics in Cognitive Sci., vol. 2, No. 4, pp. 658-677, Apr. 2010.
M. Botvinick, T. Braver, D. Barch, C. Carter, J. Cohen, "Conflict monitoring and cognitive control," Psychological Rev., vol. 108, No. 3, pp. 624-665, Jul. 2001.
M. Sakagami, X. Pan and B. Uttl, "Behavioral inhibition and prefrontal cortex in decision-making," Neural Networks, vol. 19, No. 8, pp. 1255-1265, Sep. 2006.
M. Lebedev, and S. Wise, "Insights into seeing and grasping: distinguishing the neural correlates of perception and action," Behav. Cogn. Neurosci. Rev., vol. 1, No. 2, pp. 108-129, Jun. 2002.
S. Haber, K. Kim, P. Mailly, R. Calzavara, "Reward-related cortical inputs define a large striatal region in primates that interface with associative cortical connections, proving a substrate for incentive-based learning," J. Neurosci., vol. 26, No. 32, pp. 8368-8376, Aug. 2006.
T. Robbins and A. Roberts, "Differential regulation of front-executive function by the monoamines and acetylcholine," Cerebral Cortex, vol. 17, No. supplement 1, pp. i151-i160, Sep. 2007.
J. Alcaraz and C. Maroto, "A robust genetic algorithm for resource allocation in project scheduling," Annals of Operations Res., vol. 102, No. 1, pp. 83-109, Feb. 2001.
A. Litt, C. Eliasmith, P. Thagard, "Neural affective decision theory: choices, brains, and emotions," Cognitive Systems Res., vol. 9, No. 4, pp. 252-273, Oct. 2008.
G. Loewenstein, S. Rick, and J. Cohen, "Neuroeconomics," Annu. Rev. Psychol., vol. 59, No. 1, pp. 647-672, Jan. 2008.
C. Breitenstein et al., "Tonic dopaminergic stimulation impairs associative learning in healthy subjects," Neuropsychopharm., vol. 31, No. 11, pp. 2552-2564, Jul. 2006.
G. Aston-Jones G and J. Cohen, "An integrative theory of locus coeruleus-norepinephrine function: adaptive gain and optimal performance," Annu. Rev. Neurosci., vol. 28, No. 1, pp. 403-450, Jul. 2008.
A. Dombrovski et al., "Reward/punishment reversal learning in older suicide attempters," Am. J. Psychiatry., vol. 167, No. 6, pp. 699-707, Jun. 2010.
F. Jollant et al., "Impaired decision making in suicide attempters," Am. J. Psychiatry., vol. 162, No. 2, pp. 304-310, Feb. 2005.
A. Bechara, A., Damásio, H. Damásio, S. Anderson, "Insensitivity to future consequences following damage to human prefrontal cortex," Cognition, vol. 50, No. 1-3, pp. 7-15, Apr.-Jun. 1994.
H. Markram and M. Tsodyks, "Redistribution of synaptic efficacy between neocortical pyramidal neurons," Nature, vol. 382, No. 6594, pp. 807-810, Aug. 1996.
Gail A. Carpenter and W. Ross. Art-emap: A neural network architecture for learning and prediction by evidence accumulation. IEEE Transactions on Neural Networks, 6(4):805-818, Jul. 1995.
Peter Redgrave. Basal ganglia. Scholarpedia, 2(6):1825, 2007.
Notice of Allowance for U.S. Appl. No. 14/334,649, dated Nov. 17, 2016.
A Neural Network Based System for Intrusion Detection and Classification of Attacks, by MORADI, 2004, pp. 1-6.
Training a Neural-Network Based Intrusion Detector to Recognize Novel Attacks, by Lee, 2001, pp. 294-299.
Intrusion detection using hierarchical neural networks, by Zhang, 2004, pp. 779-791.
Decisions, Decisions, Decisions. Choosing a Biological Science of Choice, by Glimcher, 2002, pp. 1-35.
Charles S Carver and Teri L White. Behavioral inhibition, behavioral activation, and affective responses to impending reward and punishment: The BIS/BAS scales. Journal of personality and social psychology, 67(2), pp. 319-333, 1994.
Suhas E Chelian, Nicholas Oros, Andrew Zaldivar, Jeffrey L Krichmar, and Rajan Bhattacharyya. Model of the interactions between neuromodulators and prefrontal cortex during a resource allocation task. In Development and Learning and Epigenetic Robotics (ICDL), 2012 IEEE International Conference on, pp. 1-6. IEEE, 2012.
Ido Erev and Greg Barron. On adaptation, maximization, and reinforcement learning among cognitive strategies. Psychological review, 112(4), pp. 912-931, 2005.
Daniel Kahneman and Amos Tversky. Choices, values, and frames. American psychologist, 39(4), pp. 341-350, 1984.
Donald Laming. Choice reaction performance following an error. Acta Psychologica, 43(3), pp. 199-224, 1979.
Michael D Lee, Shunan Zhang, Miles Munro, and Mark Steyvers. Psychological models of human and optimal performance in bandit problems. Cognitive Systems Research, 12(2), pp. 164-174, 2011.
A. Niculescu-Mizil. Multi-armed bandits with betting—on-line learning with limited feedback. In Conference on Learning Theory, Montreal, 2009, pp. 1-4.
N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2011—abstract.
N. Oros, A. Chiba, D. Nitz, M. Avery, and J. Krichmar. Simulation of the neuromodulatory pathways responsible for incrementing and decrementing attention during reversal learning and set-shifting. In Proceeding of the Society for Neuroscience, Washington, D.C., 2011—graphic.
Heuer, R. J. (1999). Psychology of intelligence analysis. Center for the Study of Intelligence, CIA, Chapter 9.
Heuer, R. J. (1999). Psychology of intelligence analysis. Center for the Study of Intelligence, CIA, Chapter 10.
Heuer, R. J. (1999). Psychology of intelligence analysis. Center for the Study of Intelligence, CIA, Chapter 11.
Heuer, R. J. (1999). Psychology of intelligence analysis. Center for the Study of Intelligence, CIA, Chapter 12.
9E. Heuer, R. J. (1999). Psychology of intelligence analysis. Center for the Study of Intelligence, CIA, Chapter 13.
Roger Ratcliff, Daniel Spieler, and Gail Mckoon. Explicitly modeling the effects of aging on response time. Psychonomic Bulletin & Review, 7(1), pp. 1-25, 2000.
Peter H Rudebeck, Mark E Walton, Angharad N Smyth, David M Bannerman, and Matthew FS Rushworth. Separate neural pathways process different decision costs. Nature neuroscience, 9(9), pp. 1161-1168, 2006.
MFS Rushworth, TEJ Behrens, PH Rudebeck, and ME Walton. Contrasting roles for cingulate and orbitofrontal cortex in decisions and social behaviour. Trends in cognitive sciences, 11(4), pp. 168-176, 2007.
Russell, S. And Norvig, P. (2003). "Artificial Intelligence: A modern approach." Upper Saddle River: Prentice-Hall, Chapter 21.
Andrew Zaldivar, Derrik E Asher, and Jeffrey L Krichmar. Simulation of how neuromodulation influences cooperative behavior. In From Animals to Animats 11, pp. 649-660. Springer, 2010.
Lebiere, C., Pirolli, P., Thomson, R., Paik, J., Rutledge-Taylor, M., Staszewski, J. & Anderson, J. R. "A functional model of sensemaking in a neurocognitive architecture", Computational intelligence and neuroscience 2013, 5, pp. 1-29.
Randy L Haupt and Sue Ellen Haupt. Practical genetic algorithms. John Wiley & Sons, 2004, Chapter 2.

* cited by examiner

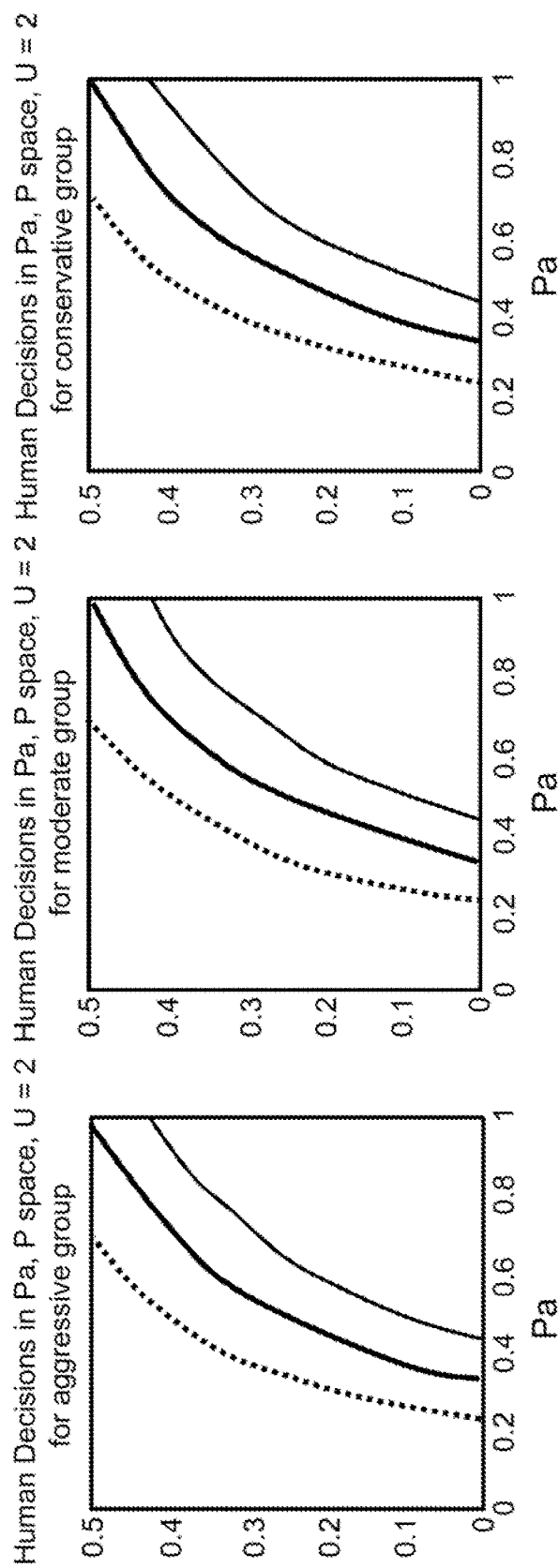

METHOD AND APPARATUS FOR MODELING PROBABILITY MATCHING HUMAN SUBJECTS IN N-ARM BANDIT TASKS

CROSS-REFERENCE TO RELATED APPLICATIONS

This is a Continuation-in-Part application of U.S. Non-Provisional application Ser. No. 14/693,485, filed Apr. 22, 2015, entitled, "Method and Apparatus for Modeling Probability Matching and Loss Sensitivity Among Human Subjects in a Resource Allocation Task," which is a Continuation-in-Part Application of U.S. Non-Provisional application Ser. No. 14/334,649, filed Jul. 17, 2014, entitled, "Method and Apparatus for an Action Selection System Based on a Combination of Neuromodulatory and Prefrontal Cortex Area Models," which is a Non-Provisional patent application of U.S. Provisional Application No. 61/885,641, filed in the United States on Oct. 2, 2013, entitled, "Method and Apparatus for an Action Selection System Based on a Combination of Neuromodulatory and Prefrontal Cortex Area Models," the entirety of which are hereby incorporated by reference as though fully set forth herein. U.S. Non-Provisional application Ser. No. 14/693,485 is ALSO a Non-Provisional Application of U.S. Provisional Patent Application No. 61/982,696, filed Apr. 22, 2014, entitled, "Method and Apparatus for Modeling Probability Matching and Loss Sensitivity Among Human Subjects in a Resource Allocation Task," the entirety of which is hereby incorporated by reference as though fully set forth herein.

This is ALSO a Continuation-in-Part application of U.S. Non-Provisional application Ser. No. 14/334,649, filed Jul. 17, 2014, entitled, "Method and Apparatus for an Action Selection System Based on a Combination of Neuromodulatory and Prefrontal Cortex Area Models," which is a Non-Provisional patent application of U.S. Provisional Application No. 61/885,641, filed in the United States on Oct. 2, 2013, entitled, "Method and Apparatus for an Action Selection System Based on a Combination of Neuromodulatory and Prefrontal Cortex Area Models," the entirety of which are incorporated herein by reference."

This is ALSO a Non-Provisional Application of U.S. Provisional Patent Application No. 62/076,444 filed Nov. 6, 2014, entitled, "Method and Apparatus for Modeling Probability Matching Human Subjects in n-Arm Bandit Tasks", the entirety of which is incorporated herein by reference."

GOVERNMENT LICENSE RIGHTS

This invention was made with government support under U.S. Government Contract Number D10PC20021 ICArUS-MINDS. The government has certain rights in the invention.

BACKGROUND OF INVENTION

(1) Field of Invention

The present invention relates to a system for modeling option selection among human subjects and, more particularly, to a system for modeling probability matching among human subjects.

(2) Description of Related Art

Probability matching is the bias of selecting options at frequencies that are proportional to base rates. Probability matching has been studied in binary assignment tasks such as the n-armed bandit (see the List of Incorporated Literature References, Literature Reference Nos. 2 and 5). Modeling probability matching and loss sensitivity (another bias) among human subjects can be used to create an explanatory and predictive model of human behavior. Such a method can then be used as a training tool, such as to derive a person's bias towards probability matching and loss sensitivity and then provide interventions against those biases.

Prior work is rooted in behavior (see Literature Reference Nos. 2 and 5), but not biology. The authors of Literature Reference No. 2 used reinforcement learning algorithms, while Lee et al. (Literature Reference No. 5) used Bayesian graphical models. However, these models are not bio-inspired and, hence, cannot make predictions of animal behavior based on lesion studies or neurotransmitter imbalances. In addition, prior work on subject modeling focuses on aggregate behavior (see Literature Reference Nos. 2 and 5). This approach can mask interesting subgroups, or phenotypes, within the overall population.

Thus, a continuing need exists for a system that is rooted in behavior and biology to handle more complex resource allocation tasks, such as capturing degrees of probability matching by considering subgroups.

SUMMARY OF THE INVENTION

The present invention relates to a system for modeling option selection among human subjects and, more particularly, to a system for modeling probability matching among human subjects. The system comprises one or more processors and a memory having instructions such that when the instructions are executed, the one or more processors perform multiple operations. A set of features related to probability matching are extracted from a set of human subject responses from behavioral tasks. Neural network model instances are trained on the set of features, resulting in a set of trained neural network model instances. A set of model parameters from the set of trained neural network instances are derived, and the set of derived model parameters is used to emulate human performance on novel data.

In another aspect, the set of derived model parameters are used to generate a model of human behavior for use as a training tool.

In another aspect, the set of derived model parameters are used to generate a model of human behavior for use in adversarial planning.

In another aspect, a plurality of sets of weights of a prefrontal cortex model are trained to parallel the set of human subject responses.

In another aspect, the prefrontal cortex model is a prefrontal cortex basal ganglia working memory (PBWM) model.

In another aspect, wherein varying degrees of conservatism in the set of human subject responses are modeled with PBWM networks.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is a plot illustrating decisions for aggressive groups according to various embodiments of the present invention;

FIG. 7B is a plot illustrating decisions for moderate groups according to various embodiments of the present invention;

FIG. 7C is a plot illustrating decisions across all missions for human subjects for conservative groups according to various embodiments of the present invention;

DETAILED DESCRIPTION

Figure 1:
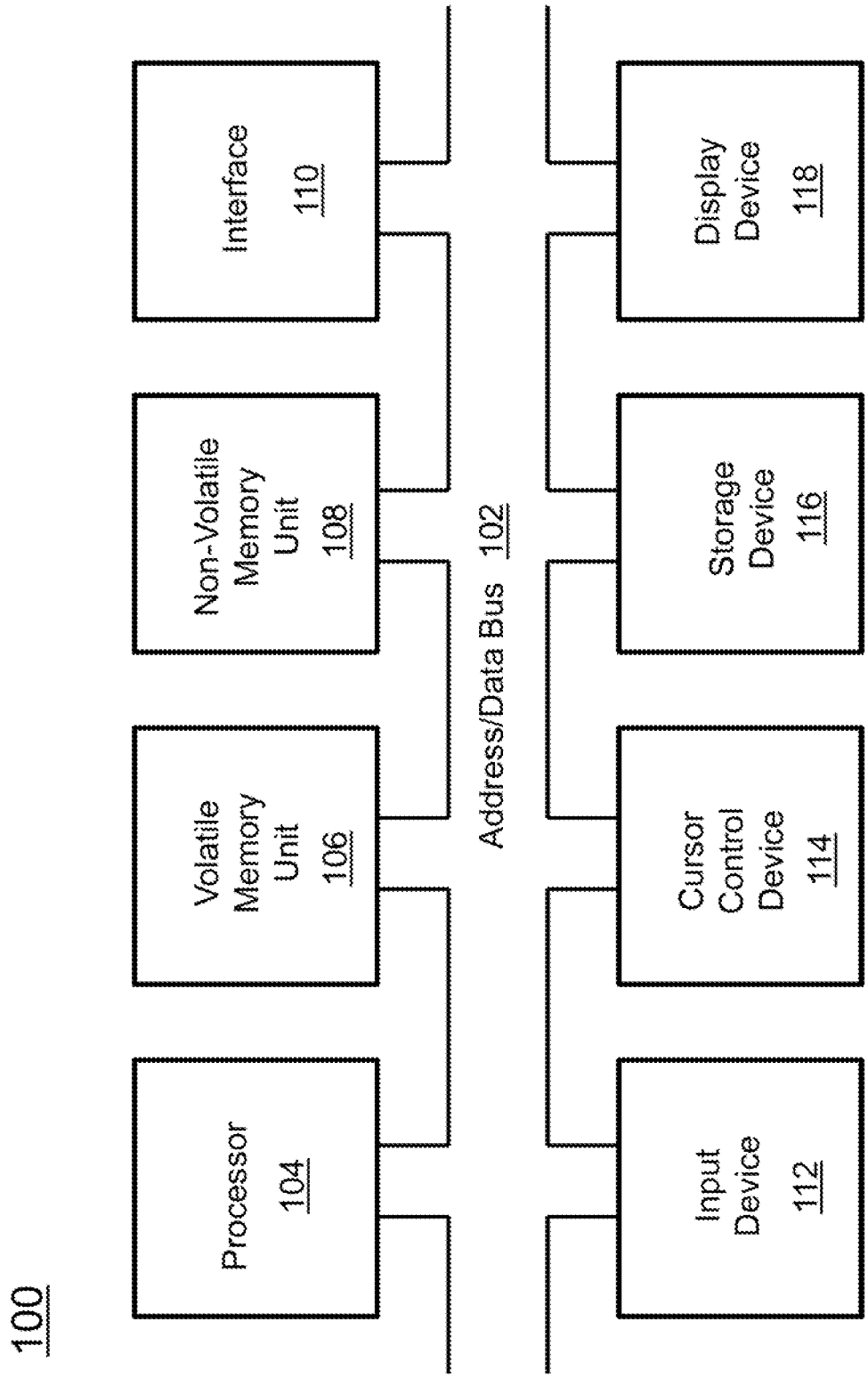
FIG. 1 is a block diagram depicting the components of a system for modeling probability matching in human subjects according to various embodiments of the present invention.

The present invention relates to a system for modeling option selection among human subjects and, more particularly, to a system for modeling probability matching among human subjects. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Chelian, S. E., Bhattacharyya, R., & O'Reilly, R. (2011). Learning categories with invariances in a neural network model of prefrontal cortex. In Proceedings of the Second Annual Meeting of the BICA Society (BICA 2011), Arlington, USA.
2. Erev, I. & Barron, G. (2005). On adaptation, maximization, and reinforcement learning among cognitive strategies. Psychological review, 112, 912-931.
3. Frank, M. J., Seeberger, L. & O'Reilly, R. C. (2004). By carrot or by stick: cognitive reinforcement learning in Parkinsonism. Science, 306, 1940-1943.
4. Herd, S. A., Krueger, K. A., Kriete, T. E., Huang, T. & O'Reilly, R. C. (2013). Strategic cognitive sequencing: a computational cognitive neuroscience approach. Computational Intelligence and Neuroscience, 149329.
5. Lee, M. D., Zhang, S., Munro, M. & Steyvers, M. (2011). Psychological models of human and optimal performance in bandit problems. Cognitive Systems Research, 12, 164-174.
6. Burns, K. and Bonaceto, C. (2014). MITRE Technical Report. Integrated cognitive-neuroscience architectures for understanding sensemaking (ICArUS): phase 2 challenge problem design and test specification.

7. O'Reilly, R. C. & Frank, M. J. (2006). Making working memory work: a computational model of learning in the frontal cortex and basal ganglia. Neural Computation, 18, 283-328.
8. Sul, J. H., Kim, H., Huh, N., Lee, D., & Jung, M. W. (2010). Distinct roles of rodent orbitofrontal and medial prefrontal cortex in decision making. Neuron, 66, 449-460.
9. Walton, M. E., Behrens, T. E., Buckley, M. J., Rudebeck, P. H., & Rushworth, M. F. (2010). Separable learning systems in the macaque brain and the role of orbitofrontal cortex in contingent learning. Neuron, 65, 927-939.
10. Wunderlich, K., Rangel, A., & O'Doherty, J. P. (2009). Neural computations underlying action-based decision making in the human brain. Proceedings of the National Academy of Sciences, 106, 17199-17204.

(2) Principal Aspects

The present invention has three "principal" aspects. The first is a system for modeling probability matching in human subjects. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
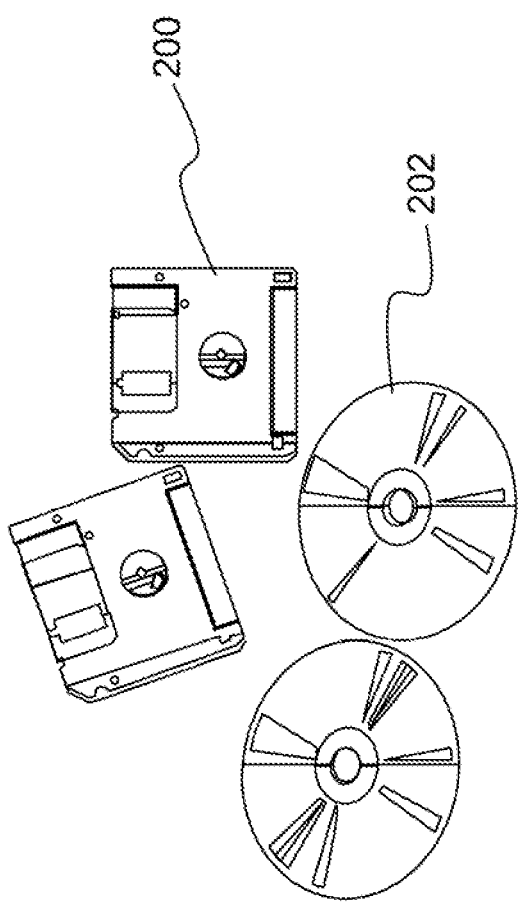
FIG. 2 is an illustration of a computer program product according to various embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The n-arm bandit problem, a class of problems where one must repeatedly choose among several alternatives with unknown and possibly dynamic payoffs, arises in several psychological and technological domains (see Literature Reference No. 5 for a review). The Bayesian optimal solution is to always pick the option with the highest expected payoff. However, humans often choose options in proportion to the expected payoff of each alternative; this is known as probability matching. A number of neuroscience studies have implicated several regions of prefrontal cortex in the n-arm bandit task in rats (see Literature Reference No. 8), monkeys (see Literature Reference No. 9) and humans (see Literature Reference No. 10). A recent model of prefrontal cortex, Prefrontal cortex Basal Ganglia Working Memory, or PBWM, has been used to recognize sequences of symbols (see Literature Reference No. 7) and perform visual scene recognition (see Literature Reference No. 1). With the present invention, PBWM networks were adapted to an n-arm bandit problem derived from a geospatial intelligence setting where one must choose to defend (e.g., arm 1) or not defend (e.g., arm 2) against an opponent. Greater degrees of conservatism with greater probability matching bias make agents (e.g., software agents) pick options closer to an even distribution than the rational winner-take-all distribution of decisions. For example, a conservative agent might select the action with the highest expected payoff (e.g., not defend) 60% of the time versus 40% of the time for the other action (e.g., defend). Conversely, lesser degrees of conservatism and probability matching bias correspond to less distance from the optimal distribution of choices (i.e., select the action with the highest expected payoff (e.g., not defend) 90% of the time). These varying degrees of conservatism were found in human data and modeled with PBWM networks.

(4) Specific Details of the Invention

Figure 3:
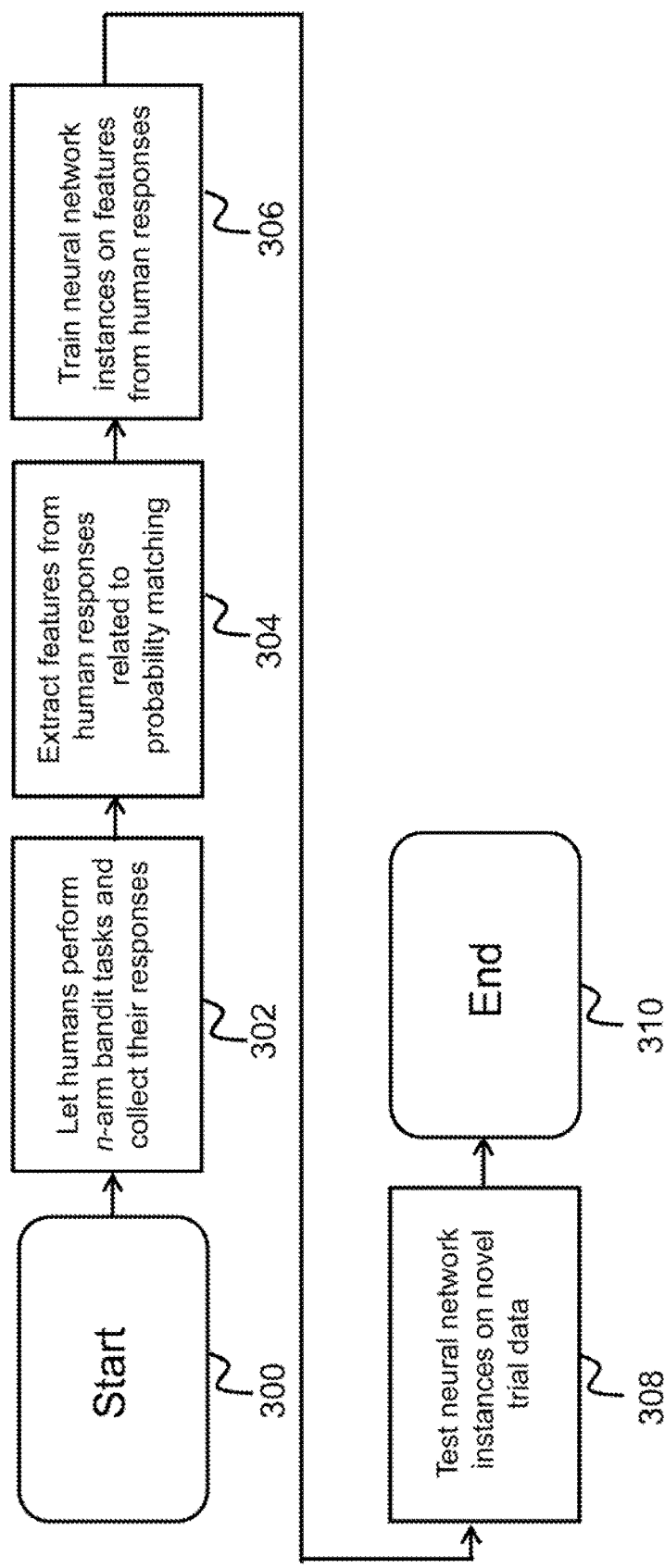
FIG. 3 is a flow diagram illustrating a system for modeling probability matching in human subjects according to various embodiments of the present invention.

The method according to embodiments of the present invention uses a combination of a behavioral task, feature extraction from human responses, and neural network model instances to emulate, or match, human performance on novel trial data, which are described in detail below. FIG. 3 illustrates a system block diagram which describes how the different modules interact to model probability matching among human subjects in n-arm bandit tasks. After the process starts 300, human subjects perform n-arm bandit tasks and their responses are collected 302. Features related to probability matching are extracted from the responses 304. Neural network instances are then trained on the features 306. The neural network instances are tested on novel trial data 308, and the process ends 310. Derived model parameters can be used to create an explanatory and predictive model of human behavior. Such a method can then be used as a training tool (e.g., derive a person's bias towards probability matching and then provide interventions against those biases) or as a tool in adversarial planning (e.g., derive a person's bias towards probability matching and then exploit those biases).

(4.1) n-Arm Bandit-Like Tasks

The n-arm bandit-like tasks were adversarial games set in a geospatial intelligence context with two players, labeled blue and red. Blue was controlled by a human or a neurocognitive model agent, while red was a computer opponent. Blue agents received information through various sources of intelligence, or INTs, about red's potential actions. In each trial, blue is informed of the strategic utility (U) of a potential attack location and the probability (P) of winning a showdown there. Red chose to attack based on P and U, and blue estimated the probability of red attack (Pa) with the INTs. Given, Pa, P, and U, blue decided to divert or not divert against a potential attack; this decision is referred to as D/~D, respectively. In the event that blue did not divert (or did divert) a potential attack and red did attack (or did not attack), no points are lost for either side. If blue diverted and red did not attack, blue has unnecessarily committed resources and loses a small amount of points. If blue did not divert and red attacked, the winner was decided probabilistically using P and the winner was awarded U points. This is summarized in the following payoff table:

TABLE 1

Payoff table of the n-arm bandit-like tasks

|  | Red Attacked | Red Did Not Attack |
| --- | --- | --- |
| Blue Diverted | 0 | −1 |
| Blue Did Not Divert | +/− U | 0 |

U can be 2, 3, 4, or 5. P was a real value between 0 and 0.5, and Pa was a real value between 0 and 1.

Figure 4A:
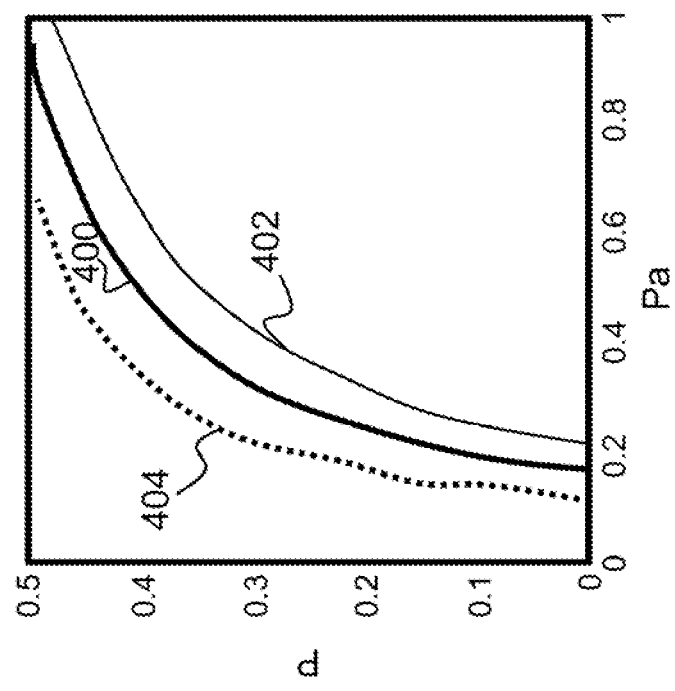
FIG. 4A is a plot illustrating decision boundaries for a strategic utility (U) of 2 according to various embodiments of the present invention.
Figure 4B:
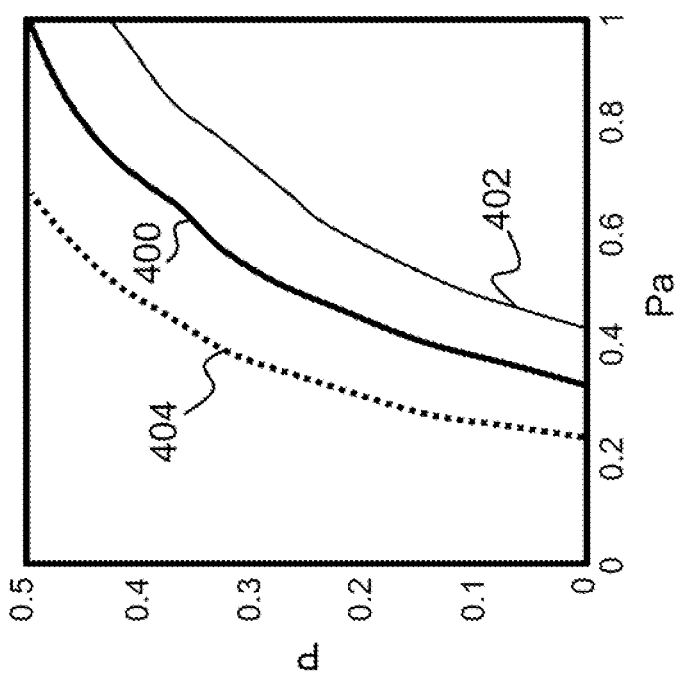
FIG. 4B is a plot illustrating decision boundaries for a strategic utility (U) of 5 according to various embodiments of the present invention.

The optimal strategy is to take the action with the highest expected payoff. From a rational basis, the decision to divert can be decided using the inequality: $-1+Pa > U \cdot Pa \cdot (2 \cdot P - 1)$. This inequality defines a decision boundary 400 in Pa, P, U space, which is illustrated in FIGS. 4A and 4B for U=2 and U=5, respectively. As Pa increases along the horizontal axis (or P decreases along the vertical axis), red is more likely to attack (or less likely to win a showdown) and, hence, blue should divert. As U increases from FIG. 4A to FIG. 4B, potential losses increase so blue should also divert. In short, for points below (or on or above) the decision boundary 400, blue should divert (or not divert) a potential attack to minimize expected loses. The rational decision boundary

400 is depicted with a bold solid line. An aggressive decision boundary with fewer diverts is depicted with an unbolded solid line 402. A conservative decision boundary with more diverts is depicted with a dashed line 404.

Blue agents played five variations or missions of the geospatial intelligence task. In the first mission, blue practiced estimating Pa given P and U and did not have to make a divert/not divert (D/~D) decision. In missions 2 through 5, blue agents made the D/~D decision with: mission 2, a basic red opponent; mission 3, a red opponent who could attack in one of two locations but not both; and missions 4 and 5, a red opponent who could vary his strategy in P, U space in two different ways. All missions had 10 trials except 4 and 5 which had 30 and 40 trials, respectively. Data from humans was collected in two rounds, first with 20 subjects (subjects 1-20), then with 30 different subjects (subjects 21-50). Each set of subjects had different mission inputs. Models according to embodiments of the present invention were built using the first set of human subjects and then tested on the second set of human subjects. Thus, to perform well, the models should generalize over human subjects and mission inputs.

(4.2) Human Subjects

Looking at the data from the first 20 human subjects, a diversity of responses was found. Subjects were grouped based on the total number of diverts they did on mission 2. This was meant to capture different degrees of conservatism before any significant learning in the task could take place. First, the average number of diverts was taken across all subjects. Second, those subjects who diverted within one trial were grouped on either side of the average; this group was called the moderate group or phenotype. Third, the two extremes of the distribution were defined: those who diverted less than the moderate group were called the aggressive group, and conversely those who divert more than the moderate group were labeled the conservative group. Thus, the aggressive (or conservative) group diverted less (or more) often than the moderate group. There were 4 (20%), 12 (60%), and 4 (20%) members in the aggressive, moderate, and conservative groups, respectively, as illustrated in FIG. 5.

Figure 5:
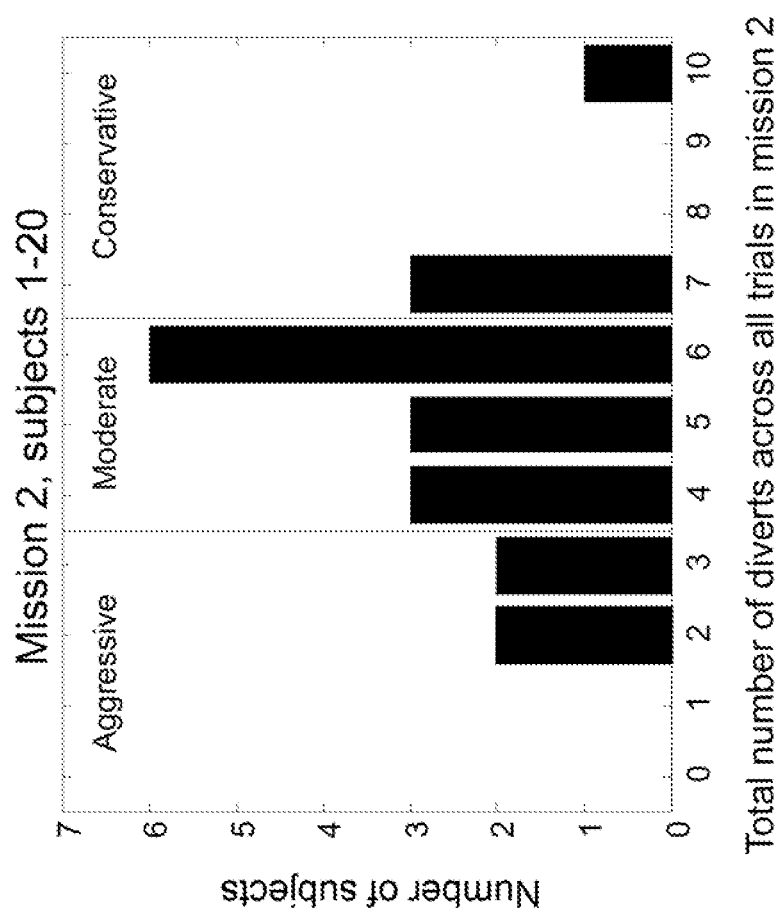
FIG. 5 is a histogram illustrating total number of diverts across all trials according to various embodiments of the present invention.

FIG. 5 depicts a histogram of the total number of diverts across all trials in mission 2 for subjects 1-20. Subjects who diverted less than the moderate group (between 0 and 3 times) were labeled as aggressive, while those who diverted more (between 7 and 10 times) were labeled as conservative. The remaining subjects were in the moderate group or phenotype, they diverted between 4 and 6 times.

It was hypothesized that moderate subjects, those closest to the average human behavior, reflect a "wisdom of the crowds" and, thus, they used a decision boundary which was close to rational. Similarly, it was hypothesized that aggressive subjects shifted their decision boundaries up, performing fewer diverts for the same Pa, P, U, point. Conversely, conservative subjects shifted their decision boundary down, performing more diverts for the same point. The aggressive and conservative decisions can be computed by adding a bias term to the rational inequality: $-1+Pa+bias>U\cdot Pa\cdot(2\cdot P-1)$. A negative bias creates an aggressive phenotype, while a positive bias creates a conservative phenotype. The moderate phenotype used no bias. For example, referring to FIG. 4A, with Pa=0.5, P=0.25, and U=2, a moderate subject would not divert because that point is on the decision boundary ($-1+0.5>?$ $2\cdot0.5\cdot(2\cdot0.25-1)$ or $-0.5=-0.5$). With an aggressive bias of $-0.3$, no divert would be made ($-0.5+-0.3>?$ $-0.5$ or $-0.8<-0.5$), but with a conservative bias of $+0.3$, a divert would be made ($-0.5+0.3>?$ $-0.5$ or $-0.2>-0.5$).

To visualize D/~D decisions, then, one can plot whether a human diverted or not for points in Pa, P, U space. A moderate subject should be approximately rational with diverts (or not diverts) below (or on or above) the rational decision boundary. Aggressive and conservative subjects should show similar patterns of diverts and not diverts when compared to their respective decision boundaries, which are illustrated in FIGS. 4A and 4B as an unbolded solid line 402 and a dashed line 404, respectively. Confusion matrices between divert/not divert behavior and ground truth responses provide complementary characterizations of human subject behavior. For example, the conservative group should have more false positives—diverting when not necessary—than the other groups.

(4.3) PBWM Networks

Figure 6:
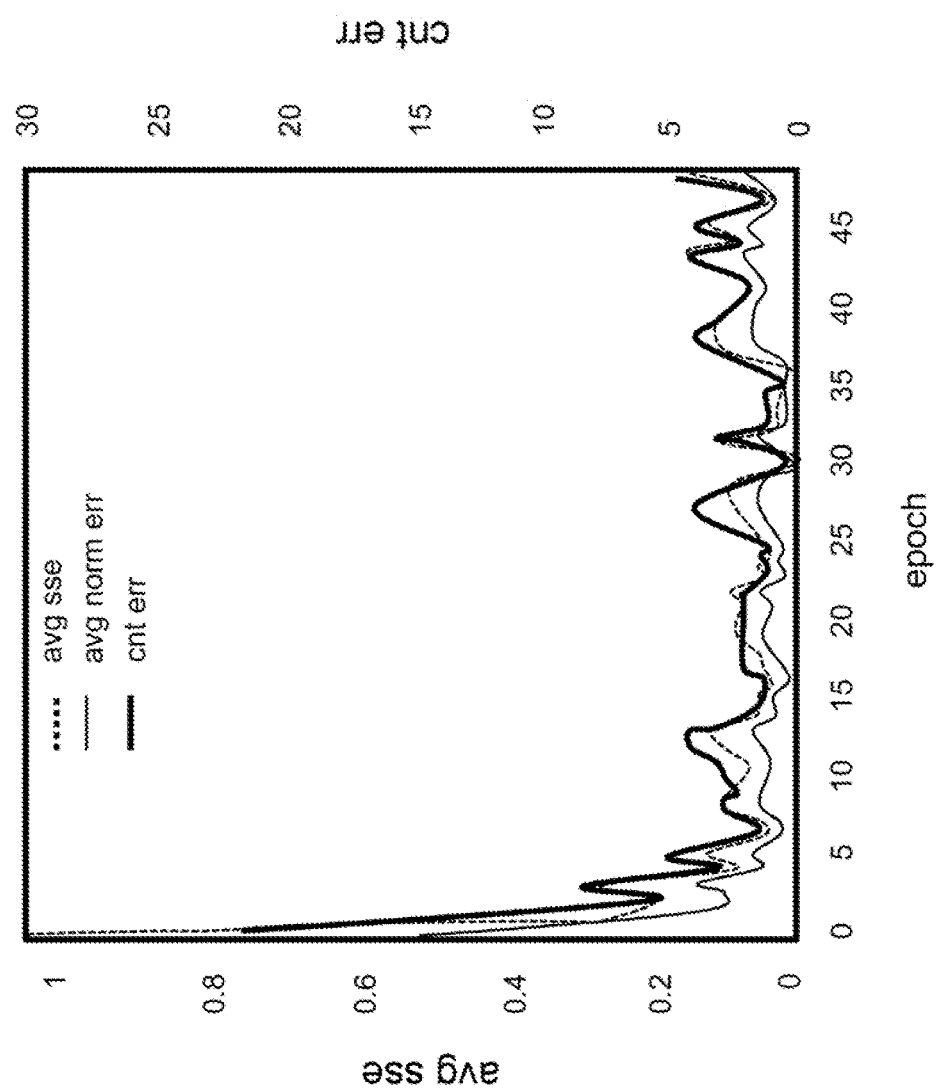
FIG. 6 is a plot illustrating training curves for prefrontal cortex basal ganglia working memory (PBWM) networks for the conservative decision boundary according to various embodiments of the present invention.

To parallel the three groups of humans—aggressive, moderate, and conservative—three different sets of PBWM weights were trained. Training consisted of randomly generating 500 points in Pa, P, and U space with D/~D decided by the decision boundaries described above. Divert was encoded as <1,0,0> and not divert as <0,1,0>; this output encoding is arbitrary. For 50 epochs, 50 points were randomly chosen from the original set of 500 points and presented to each PBWM network. Training converged quickly as shown in FIG. 6, which depicts training curves for PBWM networks for the conservative decision boundary. Training curves for the other decision boundaries were similar. PBWM networks were then integrated into a larger neurocognitive model to perform other aspects of the task such as receiving INT layers for P and U. Pa, an input to the divert network, is computed by other parts of the network based on intelligence sources and experience on previous trials. The D/~D decision and opponent decisions determined the payoff (see Table 1), which provided feedback to other parts of the network. There were a total of 40 instances of the larger neurocognitive model that included the 3 different set of PBWM weights in the approximately the same proportion as the three groups of humans in subjects 1-20.

(4.4) Comparison Between Human Subjects and PBWM Networks

If PBWM networks can emulate performance across human subjects and mission inputs, qualitative trends across the different phenotypes should occur. For example, the number of divert decisions as well as false positives should increase from the aggressive to conservative phenotypes for human subjects and PBWM networks alike. These trends can be examined by producing D/~D decision plots and confusion matrices. In addition, on a trial by trial basis, the average human and PBWM network response can be compared. On trials where humans diverted more than 50% of the time, PBWM networks should do the same (and similarly for trials with less than 50% of divert choices). This similarity can be quantified by correlation coefficients.

(4.5) Experimental Studies

For this section, the assumptions for the first 20 subjects were applied to the data from the subjects 21-50.

(4.5.1) Human Subjects

Using the definition of groups derived from subjects 1-20, each subject from subjects 21-50 was assigned into the aggressive, moderate, and conservative groups. For example, if a subject diverted 4 (or 7) times in mission 2, they would fall into the moderate (or conservative) group definition (see FIG. 5). For subjects 21-50, 2 (6.67%), 16

(53.33%), and 12 (40%) subjects were found in the aggressive, moderate, and conservative groups in that order. With respect to the first set of subjects, subjects 21-50 have a rightward skew towards more diverts. Below, for each group in subjects 21-50, D/~D decisions were plotted across all missions and decision boundaries using a representative U value of 2.

FIGS. 7A-7C illustrate divert/not divert decisions across all missions for human subjects 21-50 for aggressive groups (FIG. 7A), moderate groups (FIG. 7B), and conservative groups (FIG. 7C). In each of the plots, the rational decision boundary is depicted with a bold solid line. An aggressive decision boundary with fewer diverts is depicted with a dashed line. A conservative decision boundary with more diverts is depicted with an unbolded solid line. The same bounds and decision boundaries shown in FIG. 4A are also shown here (U=2). In FIG. 7A, the aggressive group has more "not diverts" than "diverts" and the not divert points fall above the aggressive decision boundary (dashed line) with divert decisions mostly falling below it.

In FIG. 7B, for the moderate group, there appear to be roughly the same number of not diverts as diverts with more not diverts above the optimal curve (i.e., rational decision boundary; bold solid line) than below it and conversely for diverts. The number of false negatives appears to be smaller than the number of false positive but with no apparent pattern. In FIG. 7C, the conservative group has more not diverts than diverts. However, not diverts typically fall above the conservative decision boundary (i.e., unbolded solid line) and most diverts fall below it. The confusion matrices shown in Table 2 (below) are also consistent with this trend across groups for subjects 21-50.

The number of diverts (i.e., the sum of the second column) increases from left to right, from the aggressive to the conservative groups. In addition, so does the number of false positives which is the number in the upper right of each confusion matrix. Interestingly, there is no general trend with percent correct, 85%, 76.5% and 81.46% for aggressive, moderate and conservative groups in that order, for subjects 21-50.

TABLE 2

| | (a) Aggressive Subjects 21-50 | | (b) Moderate Subjects 21-50 | | (c) Conservative Subjects 21-50 | |
|---|---|---|---|---|---|---|
| | ~D | D | ~D | D | ~D | D |
| ~D | 63.75 | 12.50 | ~D 50.62 | 14.53 | ~D 52.08 | 16.04 |
| D | 2.50 | 21.25 | D 8.91 | 25.94 | D 2.50 | 29.38 |

Table 2 lists confusion matrices for human subjects 21-50 for (a) aggressive, (b) moderate, and (c) conservative groups. Each confusion matrix is an average over all subjects in a group. In each confusion matrix, rows are the ground truth and columns are the responses. For example, a false positive response of diverting when there is no attack would be in the 1st row, 2nd column.

(4.5.2) PBWM Networks

Figures 8A, 8B, 8C:
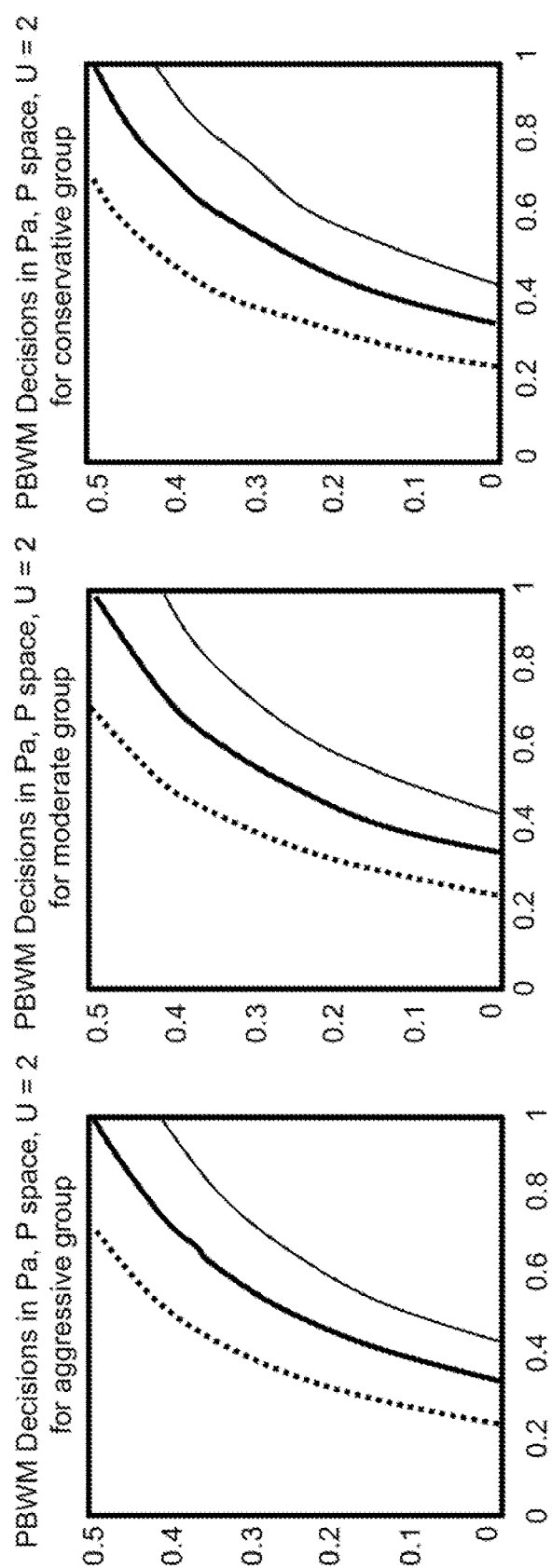
FIG. 8A is a plot illustrating decisions across all missions for PBWM model runs for aggressive groups according to various embodiments of the present invention.
FIG. 8B is a plot illustrating decisions across all missions for PBWM model runs for moderate groups according to various embodiments of the present invention.
FIG. 8C is a plot illustrating decisions across all missions for PBWM model runs for conservative groups according to various embodiments of the present invention.

Next, the decisions made by the PBWM networks according to embodiments of the present invention were examined to see if they generalized to new data points and matched different phenotypes of human decision making. FIGS. 8A-8C depict divert/not divert decisions across all missions for PBWM model runs for human subjects 21-50 for the aggressive group (FIG. 8A), the moderate group (FIG. 8B), and the conservative group (FIG. 8C). The same bounds and decision boundaries shown in FIG. 4A are also shown here (U=2). In each of the plots, the rational decision boundary is depicted with a bold solid line. An aggressive decision boundary with fewer diverts is depicted with a dashed line. A conservative decision boundary with more diverts is depicted with an unbolded solid line.

For all groups, other parts of the larger neurocognitive network estimated Pa lower than humans. This shifted points in Pa, P space to the left, above even the aggressive decision boundary (dashed line) causing more diverts than humans did. In FIG. 8A, the aggressive set of models (i.e., aggressive group) has fewer diverts than not diverts. Furthermore, with respect to the optimal decision boundary (bold solid line), there are more false negatives (3) than false positives (0), indicative of an aggressive stance. In FIG. 8B, for the moderate set of networks (i.e., the moderate group), diverts fall below the optimal decision boundary (bold solid line) while not diverts fall above it. There are neither false positives nor false negatives. In FIG. 8C, the conservative set of networks (i.e., the conservative group) produces more diverts than not diverts with diverts below the conservative decision boundary (solid unbolded line) and conversely for not diverts (with the exception of 2 false negatives). Furthermore, with respect to the optimal decision boundary (bold solid line), there are more false positives than false negatives indicative of a conservative stance. The confusion matrices shown in Table 3 below are also consistent with this trend across groups for model runs for subjects 21-50. The number of diverts—the sum of the second column—increases from left to right, from the aggressive to the conservative groups. In addition, so does the number of false positives, which is the number in the upper right of each confusion matrix. These trends match the human data. Here, for the model runs for subjects 21-50, there is a general trend with percent correct—90.5%, 97% and 93% for aggressive, moderate and conservative groups in that order meaning the moderate group was most rational.

TABLE 3

| | (a) Aggressive PBWM for subjects 21-50 | | (b) Moderate PBWM for subjects 21-50 | | (c) Conservative PBWM for subjects 21-50 | |
|---|---|---|---|---|---|---|
| | ~D | D | ~D | D | ~D | D |
| ~D | 65.50 | 0.00 | ~D 63.00 | 3.00 | ~D 59.00 | 7.00 |
| D | 9.50 | 25.00 | D 0.00 | 34.00 | D 0.00 | 34.00 |

Table 3 depicts confusion matrices for PBWM networks for subjects 21-50 for (a) aggressive, (b) moderate, and (c) conservative groups. Each confusion matrix is an average over all model runs in a group. In each confusion matrix, rows are the ground truth and columns are the responses. For example, a false positive response of diverting when there is no attack would be in the 1st row, 2nd column.

(4.5.3) Comparison Between Human Subjects and PBWM Networks

Figure 9:
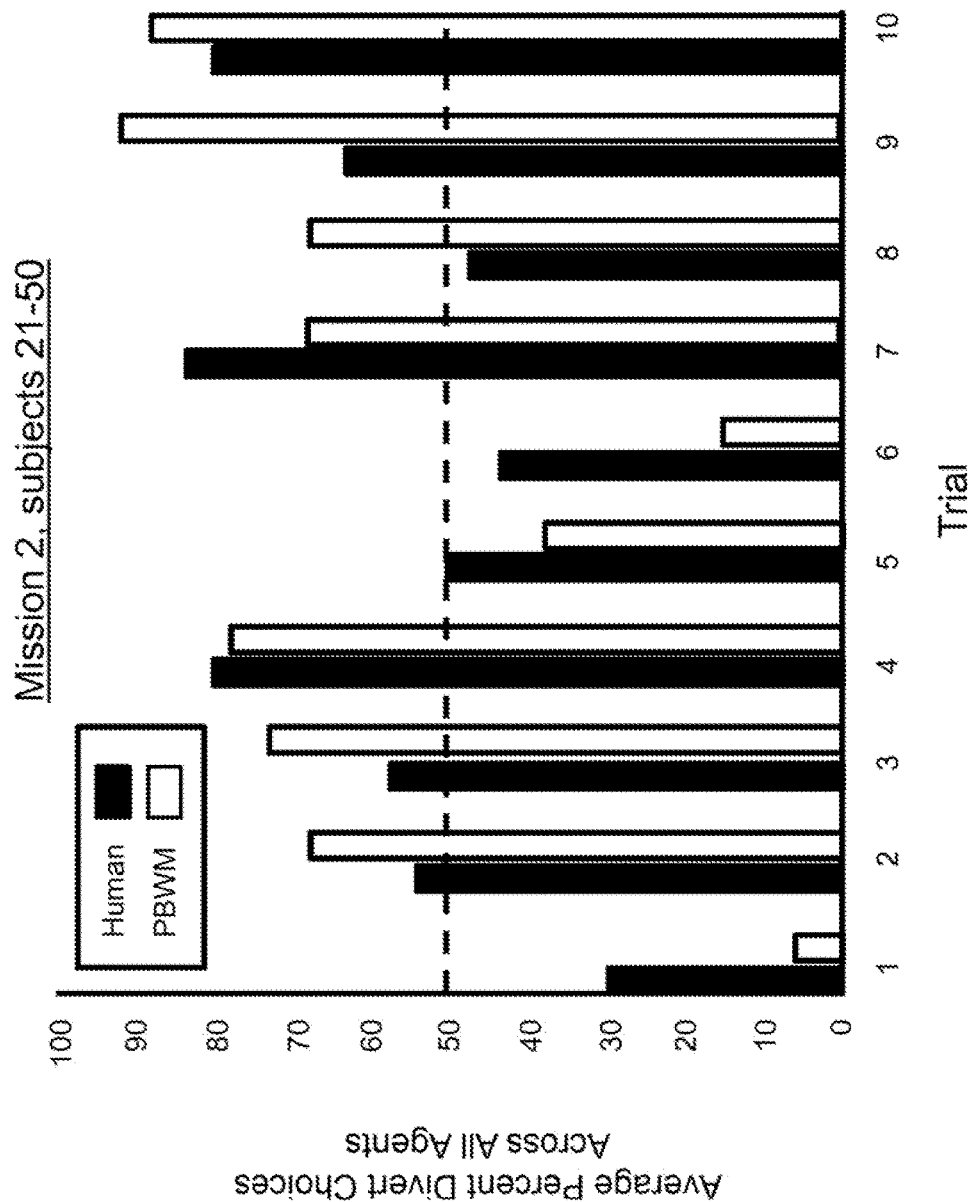
FIG. 9 is a histogram illustrating a comparison of average percentage divert choices on each trial between human subjects and PBWM networks according to various embodiments of the present invention.

To compare trial by trial responses, FIG. 9 shows a time series comparing average human performance to average PBWM performance on mission 2 for subjects 21-50 (mission 2 is the mission with the least complexity). Specifically, FIG. 9 shows a comparison of average percentage of divert choices on each trial between humans (filled bars) and PBWM networks (unfilled bars). When more than 50% of humans divert, PBWM networks do likewise in trials 2, 3, 4, 7, 9, and 10. Similarly, when less than or equal to 50% of humans divert in trials 1, 5, 6, and 8, PBWM networks also divert less than 50% of the time with the exception of trial 8 (trials 1 and 6 also show much less diverts from PBWM).

To quantify the agreement between average human and average PBWM network responses, the trial by trial correlation coefficients between humans and PBWM networks for each mission for subjects 21-50 are listed in Table 4 below. Except for mission 3, across all missions, correlations are high and statistically different from chance. On mission 3, the complication of 2 possible attack points may have led to a lower correlation coefficient. A star represents a statistically significant correlation (t-test, $p<0.05$).

In summary, experimental studies using the system and method according to embodiments of the present invention showed that the PBWM models of decision making can model (or emulate) different phenotypes of human behavior even with novel trial stimuli and subjects. For both humans and PBWM networks, conservative agents showed more probability matching bias than aggressive or moderate agents, with more false positives and a larger number of divert decisions than the other two groups.

Literature Reference No. 4 describe an extension to PBWM, called PBDM (Prefrontal cortex Basal ganglia Decision Making). PBDM extends previous theories of how frontal cortex and basal ganglia work together to perform action selection (see Literature Reference No. 3) and selection of items to maintain in working memory (see Literature Reference No. 7) to account for more abstract types of human decision making. In this particular task with two possible choices, divert or not divert, the selection of candidate actions is trivial, and it is assumed that the two options are weighed in parallel, in separate sets of "stripes" which are continuous, related circuits through PFC and BG. PBDM can either weigh a few well-learned options in parallel, or consider a single more novel option/context at a time, serially. The choice of treating this task as well-learned is somewhat at odds with the relative novelty of the task, but good fits to human data suggest that it is not unreasonable—the decision framing of "make a bet or not" could be considered well-learned if it is successfully generalized from the many related experiences humans encounter in their lives (e.g., cross the street or not when faced with the Walk/Don't Walk sign, bet or not bet in casino games, etc.).

The model's qualitative and quantitative fits to human data are encouraging. It also fits a broader range of functional and physiological data than more abstract functional models of human decision making. The invention described herein is some of the first to apply the theories of PFC and BG function to abstract decision making.

Modeling probability matching among human subjects has multiple applications. The system described herein can be utilized for resource allocation or training. For instance, employees who are strong in a given ability (e.g., less bias to probability matching) can be assigned to roles that require that skill. Similarly, those employees who are weak in a given ability can be selected for further training. Additionally, consumer action selection (e.g., which car to purchase) and adversarial action selection (e.g., electronic warfare) can be modeled using embodiments of the present invention.

Furthermore, government agencies are also interested in modeling probability matching among human subjects. For example, some programs are concerned with detecting biases in image analysts which may be precipitated by different cognitive abilities.

What is claimed is:

1. A system for modeling probability matching among human subjects for employee training, the system comprising:
one or more processors and a non-transitory computer-readable medium having executable instructions encoded thereon such that when executed, the one or more processors perform operations of:
extracting a set of features related to probability matching from a set of data comprising human subject responses from behavioral tasks related to a skill;
training neural network model instances on the set of features, resulting in a set of trained neural network model instances;
deriving a set of model parameters from the set of trained neural network instances;
generating a model of human behavior using the set of derived model parameters;
applying the model of human behavior to a set of new data comprising employee responses;
automatically selecting one or more employees for training in the skill.

2. The system as set forth in claim 1, wherein a plurality of sets of weights of a prefrontal cortex model are trained to parallel the set of human subject responses.

3. The system as set forth in claim 2, wherein the prefrontal cortex model is a prefrontal cortex basal ganglia working memory (PBWM) model.

4. The system as set forth in claim 3, wherein varying degrees of conservatism in the set of human subject responses are modeled with PBWM networks.

5. A computer-implemented method for modeling probability matching among human subjects for employee training, comprising:
an act of causing one or more processors to execute instructions stored on a non-transitory memory such that upon execution, the one or more processors perform operations of:
extracting a set of features related to probability matching from a set of data comprising human subject responses from behavioral tasks related to a skill;
training neural network model instances on the set of features, resulting in a set of trained neural network model instances;
deriving a set of model parameters from the set of trained neural network instances;
generating a model of human behavior using the set of derived model parameters;
applying the model of human behavior to a set of new data comprising employee responses;
automatically selecting one or more employees for training in the skill.

6. The method as set forth in claim 5, wherein a plurality of sets of weights of a prefrontal cortex model are trained to parallel the set of human subject responses.

7. The method as set forth in claim 6, wherein the prefrontal cortex model is a prefrontal cortex basal ganglia working memory (PBWM) model.

8. The method as set forth in claim 7, wherein varying degrees of conservatism in the set of human subject responses are modeled with PBWM networks.

9. A computer program product for modeling probability matching among human subjects for employee training, the computer program product comprising:
computer-readable instructions stored on a non-transitory computer-readable medium that are executable by a computer having one or more processors for causing the processor to perform operations of:
extracting a set of features related to probability matching from a set of data comprising human subject responses from behavioral tasks related to a skill;

training neural network model instances on the set of features, resulting in a set of trained neural network model instances;

deriving a set of model parameters from the set of trained neural network instances;

generating a model of human behavior using the set of derived model parameters;

applying the model of human behavior to a set of new data comprising employee responses;

automatically selecting one or more employees for training in the skill.

10. The computer program product as set forth in claim 9, wherein a plurality of sets of weights of a prefrontal cortex model are trained to parallel the set of human subject responses.

11. The computer program product as set forth in claim 10, wherein the prefrontal cortex model is a prefrontal cortex basal ganglia working memory (PBWM) model.

12. The computer program product as set forth in claim 11, wherein varying degrees of conservatism in the set of human subject responses are modeled with PBWM networks.

\* \* \* \* \*